(12) United States Patent
Troitino Lopez et al.

(10) Patent No.: US 11,099,010 B2
(45) Date of Patent: Aug. 24, 2021

(54) SHAFT CENTERLINE ALIGNMENT SYSTEM FOR ROTATING EQUIPMENT

(71) Applicant: General Electric Company, Schenectady, NY (US)

(72) Inventors: Jose Troitino Lopez, Windermere, FL (US); Robert Edward Huth, Greenville, SC (US); Zachary Lane Walters, Woodruff, SC (US)

(73) Assignee: General Electric Company, Schenectady, NY (US)

( * ) Notice: Subject to any disclaimer, the term of this patent is extended or adjusted under 35 U.S.C. 154(b) by 598 days.

(21) Appl. No.: 16/014,427

(22) Filed: Jun. 21, 2018

(65) Prior Publication Data
US 2019/0390572 A1     Dec. 26, 2019

(51) Int. Cl.
| | | |
|---|---|---|
| *G01B 11/27* | (2006.01) | |
| *F01D 5/02* | (2006.01) | |
| *F01D 21/00* | (2006.01) | |
| *F01D 25/28* | (2006.01) | |
| *G01B 11/10* | (2006.01) | |

(52) U.S. Cl.
CPC ............ *G01B 11/272* (2013.01); *F01D 5/027* (2013.01); *F01D 21/003* (2013.01); *F01D 25/285* (2013.01); *G01B 11/10* (2013.01); *G01B 11/27* (2013.01); *F05D 2230/64* (2013.01)

(58) Field of Classification Search
CPC ...... F01D 21/003; F01D 25/285; F01D 5/027; F05D 2230/64; G01B 11/10; G01B 11/27; G01B 11/272
See application file for complete search history.

(56) References Cited

U.S. PATENT DOCUMENTS

| | | | |
|---|---|---|---|
| 4,319,406 A | 3/1982 | Pehrson, Sr. et al. | |
| 4,709,485 A | 12/1987 | Bowman | |
| 5,077,905 A | 1/1992 | Murray, Jr. | |
| 5,199,182 A | 4/1993 | Fowler | |

(Continued)

FOREIGN PATENT DOCUMENTS

KR        101452974 B1    10/2014

OTHER PUBLICATIONS

Heinz P. Bloch, "Laser Optics Accurately Measure Running Shaft Alignment", Oil & Gas Journal, Nov. 5, 1990, vol. 88No. 45, pp. 42-45.

(Continued)

*Primary Examiner* — Violeta A Prieto
(74) *Attorney, Agent, or Firm* — James Pemrick; Hoffman Warnick LLC

(57) ABSTRACT

An alignment system and method for aligning the shaft centerline of rotating equipment positioned on opposing roller stands are provided. The system includes a laser transmission unit on the first stand and a target unit on the second stand. The laser transmission unit includes a laser that transmits a laser beam to a target on the target unit. When the laser beam contacts the center of the target, the roller stands are aligned. The system may be automated to detect the position of the laser beam relative to the target center and to adjust, as needed, the position of one of or both the roller stands using hydraulic cylinders coupled to a roller stand platform. The system and method reduce the time, effort, and manpower required to perform the alignment.

20 Claims, 16 Drawing Sheets

(56) References Cited

U.S. PATENT DOCUMENTS

| | | |
|---|---|---|
| 5,371,953 A | 12/1994 | Nower et al. |
| 5,684,578 A | 11/1997 | Nower et al. |
| 6,223,102 B1 * | 4/2001 | Busch .................. G01B 11/272 |
| | | 33/645 |
| 6,411,375 B1 | 6/2002 | Hinkle et al. |
| 6,476,914 B1 | 11/2002 | Hoelzi et al. |
| 6,792,838 B2 | 9/2004 | Brooks et al. |
| 6,874,986 B2 | 4/2005 | Koppel et al. |
| 6,898,547 B1 | 5/2005 | DeBlois et al. |
| 7,143,520 B2 | 12/2006 | Engels |
| 7,739,072 B2 | 6/2010 | DeBlois et al. |
| 7,765,082 B2 | 7/2010 | Lee |
| 9,279,672 B1 * | 3/2016 | Garcia-Lopez ...... G01B 11/272 |

OTHER PUBLICATIONS

European Search Report issued in connection with corresponding EP Application No. 19181835.0 dated Nov. 27, 2019, 16 pages.

\* cited by examiner

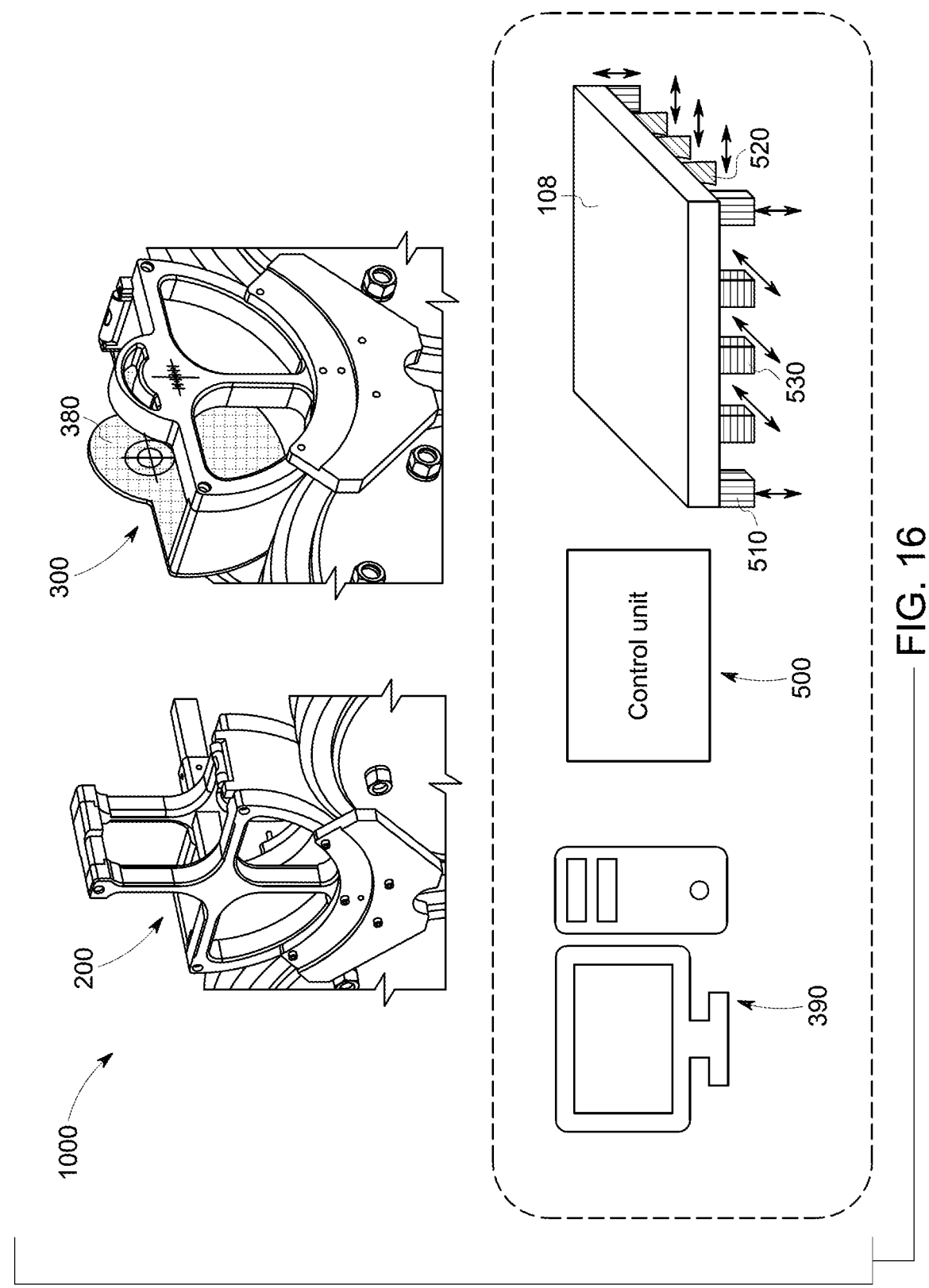

SHAFT CENTERLINE ALIGNMENT SYSTEM FOR ROTATING EQUIPMENT

TECHNICAL FIELD

The present disclosure relates generally to the field of alignment equipment and, more specifically, to a system and method that use a laser beam to align the shaft centerline of rotating equipment, such as a gas turbine rotor. According to one aspect provided herein, the rotor is supported by oppositely disposed roller stands, and the position of at least one of the roller stands may be adjusted such that a laser beam originating from one roller stand contacts the center of a target on an opposing roller stand. In one embodiment, the adjustment of the roller stand is performed automatically using hydraulic cylinders coupled to a control unit that receives data about the position of the laser beam relative to the target.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where fuel is introduced, and a fuel/air mixture is ignited and burned to form combustion products. The combustion products function as the operational fluid of the turbine.

The operational fluid then flows through a fluid flow path in a turbine, the flow path being defined between a plurality of rotating blades and a plurality of stationary nozzles disposed between the rotating blades, such that each set of rotating blades and each corresponding set of stationary nozzles defines a turbine stage. As the plurality of rotating blades rotate the rotor of the gas turbine system, a generator, coupled to the rotor, may generate power from the rotation of the rotor. The rotation of the turbine blades also causes rotation of the compressor blades, which are coupled to the rotor.

Conventionally, during maintenance, a gas turbine rotor may be removed from the gas turbine casing and supported on each end by a roller system to permit inspection and servicing of the rotor, the compressor blades, and/or the turbine blades. The roller system may include a powered roller stand and an idler roller stand. It is necessary to position the rotor stands to achieve perfect alignment of the rotor centerline within the roller stands to prevent the rotor from moving axially ("walking") off the roller stands, as the rotor is rotated at slow speeds. With perfect alignment, the rotor journal bearing surfaces are level and aligned with each other. If the rotor is not perfectly aligned within the roller stands, the technicians are required to stop their inspection or maintenance processes and re-align the roller stands, which is a time-consuming process.

This problem of properly aligning the rotor within the roller stands is challenging due to the weight and length of the rotor. Conventionally, the alignment process has required the skills of two technicians, using rudimentary tools such as tape measures, to measure the alignment of the roller stands and to adjust the roller stands, using shims, until the desired perfect alignment is achieved. In some instances, this process could occupy the time of the two technicians for as long as eight hours.

SUMMARY

An alignment system and method for aligning the shaft centerline of rotating equipment positioned on opposing roller stands are provided. The system includes a laser transmission unit on the first stand and a target unit on the second stand. The laser transmission unit includes a laser that transmits a laser beam to a target on the target unit. When the laser beam contacts the center of the target, the roller stands are aligned. The system may be automated to detect the position of the laser beam relative to the target center and to adjust, as needed, the position of one of or both the roller stands using hydraulic cylinders coupled to a roller stand platform. The system and method reduce the time, effort, and manpower required to perform the alignment.

More specifically, according to one aspect provided herein, an alignment system for aligning the shaft centerline of rotating equipment positioned on opposing roller stands. The alignment system includes a laser transmission unit configured for engagement with a first roller stand and a target unit configured for engagement with a second roller stand axially spaced from the first roller stand. The laser transmission unit includes a first front plate defining a first laser transmission hole therethrough, a first back plate axially spaced from the first front plate, a first arcuate panel extending axially between the first front plate and the first back plate and being configured to contact a first pair of roller wheels of the first roller stand, and a laser centrally mounted through the first back plate and extending to the first front plate, such that a laser beam produced by the laser is transmitted through the first laser transmission hole of the first front plate. The target unit includes a second front plate defining a second laser transmission hole therethrough, a second back plate axially spaced from the second front plate and being provided with an image of a target, the target having a center aligned with the second laser transmission hole, and a second arcuate panel extending axially between the second front plate and the second back plate and being configured to contact a second pair of roller wheels of the second roller stand. When a laser beam from the laser transmission unit passes through the second laser transmission hole of the second front plate and reaches the center of the target on the second back plate, the first roller stand and the second roller stand are aligned.

According to another aspect provided herein, a method of aligning the heights of opposing roller stands is provided. The alignment method includes: positioning a laser transmission unit on a first roller stand and a target unit on a second roller stand; directing a laser beam from the laser transmission unit to the target unit; determining a location at which the laser beam contacts the second back plate of the target unit; and adjusting a position of the first roller stand until the laser beam contacts the center of the target. The laser transmission unit includes a first front plate defining a first laser transmission hole therethrough, a first back plate axially spaced from the first front plate, a first arcuate panel extending axially between the first front plate and the first back plate and being configured to contact a first pair of roller wheels of the first roller stand, and a laser centrally mounted through the first back plate and extending to the first front plate, such that a laser beam produced by the laser is transmitted through the first laser transmission hole of the first front plate. The target unit includes a second front plate defining a second laser transmission hole therethrough, a second back plate axially spaced from the second front plate and being provided with an image of a target, the target having a center aligned with the second laser transmission hole, and a second arcuate panel extending axially between the second front plate and the second back plate and being configured to contact a second pair of roller wheels of the second roller stand.

BRIEF DESCRIPTION OF DRAWINGS

The specification, directed to one of ordinary skill in the art, sets forth a full and enabling disclosure of the present system and method, including the best mode of using the same. The specification refers to the appended figures, in which:

FIG. 16 illustrates the various components of the present alignment system, as described herein.

DETAILED DESCRIPTION

Figure 1:
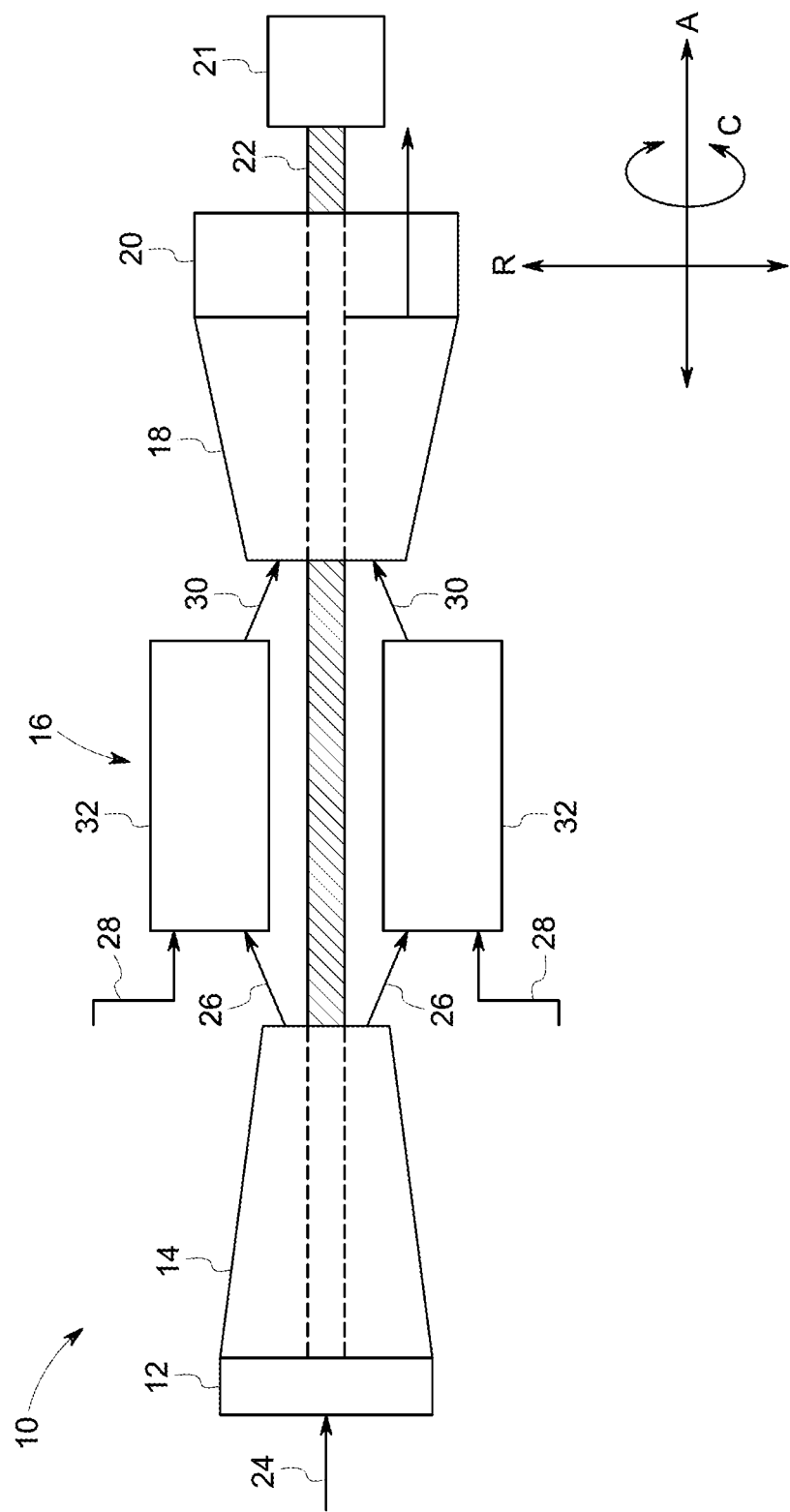
FIG. 1 is a functional block diagram of an exemplary gas turbine that may incorporate various embodiments of the present disclosure.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current laser alignment system, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the inlet end of the combustor, and "aft" being used to describe components located toward the rearward (or turbine) end of the engine or toward the outlet end of the combustor. The terms "inner" or "proximal" are used to describe components in proximity to the turbine shaft, while the terms "outer" or "distal" are used to describe components distal to the turbine shaft.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a laser alignment system for the rotor of a land-based power-generating gas turbine for purposes of illustration, one of ordinary skill in the art will readily appreciate that embodiments of the present disclosure may be applied to alignment of many types of devices across many industries.

Referring now to the drawings, FIG. 1 schematically illustrates an exemplary gas turbine 10. The gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 (also known as "rotors") that couple the compressor 14 to the turbine 18.

During operation, air 24 flows through the inlet section 12 and into the compressor 14, where the air 24 is progressively compressed, thus providing compressed air 26 to the combustion section 16. At least a portion of the compressed air 26 is mixed with a fuel 28 within the combustion section 16 and burned to produce combustion gases 30. The combustion section 16 may include a circumferential array of combustion cans 32, two of which are illustrated in FIG. 1, or may instead be an annular combustion system. The combustion gases 30 flow from the combustion section 16 to into the turbine 18, where thermal and/or kinetic energy are transferred from the combustion gases 30 to rotor blades (shown in FIG. 2) attached to the shaft 22, thereby causing the shaft 22 to rotate. The mechanical rotational energy may then be used for various purposes, such as to power the compressor 14 and/or to generate electricity, via a generator 21 coupled to the shaft 22. The combustion gases 30 exiting the turbine 18 may then be exhausted from the gas turbine 10, via the exhaust section 20.

Figure 2:
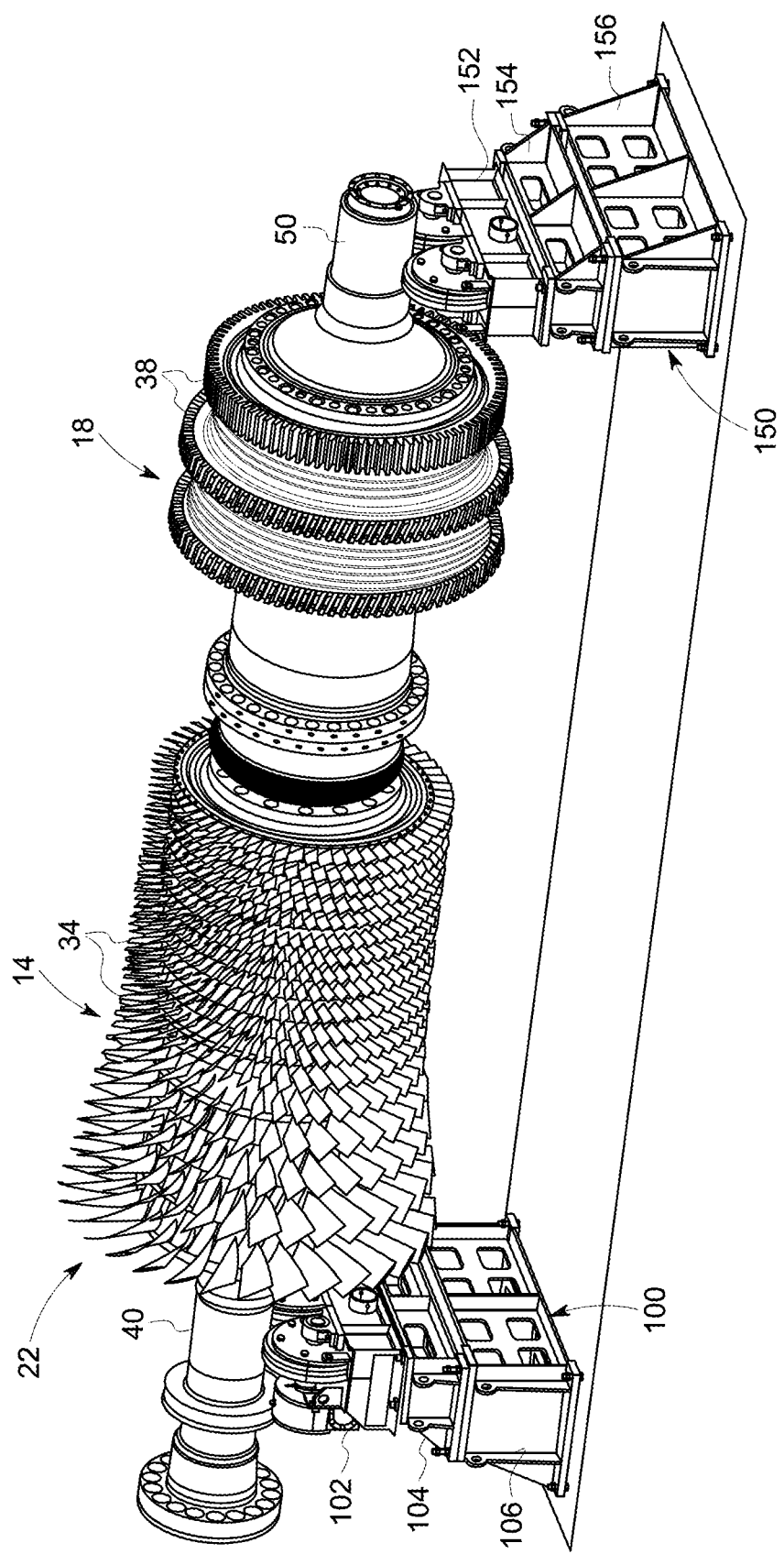
FIG. 2 is perspective view of a gas turbine rotor positioned on a pair of oppositely disposed roller stands, according to one aspect of the present disclosure.

FIG. 2 is a perspective side view of the rotor shaft 22, as removed from the gas turbine casing and supported on a pair of oppositely disposed roller stands 100, 150. The rotor shaft 22 includes a compressor section 14 with multiple (from eight to twenty) stages of rotating blades 34 and a turbine section 18 with several (typically, three or four) stages of rotating blades 38. A forward journal bearing 40 supports the forward end of the compressor section 16, while an aft journal bearing 50 supports the aft end of the turbine section 18. During inspection and maintenance, the journal bearings 40, 50 are disposed in the roller stands 100, 150.

The roller stand 100 may be a powered roller stand, while the roller stand 150 may be an idler roller stand. As shown, a forward (compressor) end of the rotor shaft 22 is supported by the powered roller stand 100, and the aft (turbine) end of the rotor shaft 22 is supported by the idler roller stand 150. Such arrangement is not required; that is, the rotor shaft 22 may be arranged with the forward end supported by the idler roller stand 150 and the aft end supported by the powered roller stand 100.

Figure 3:
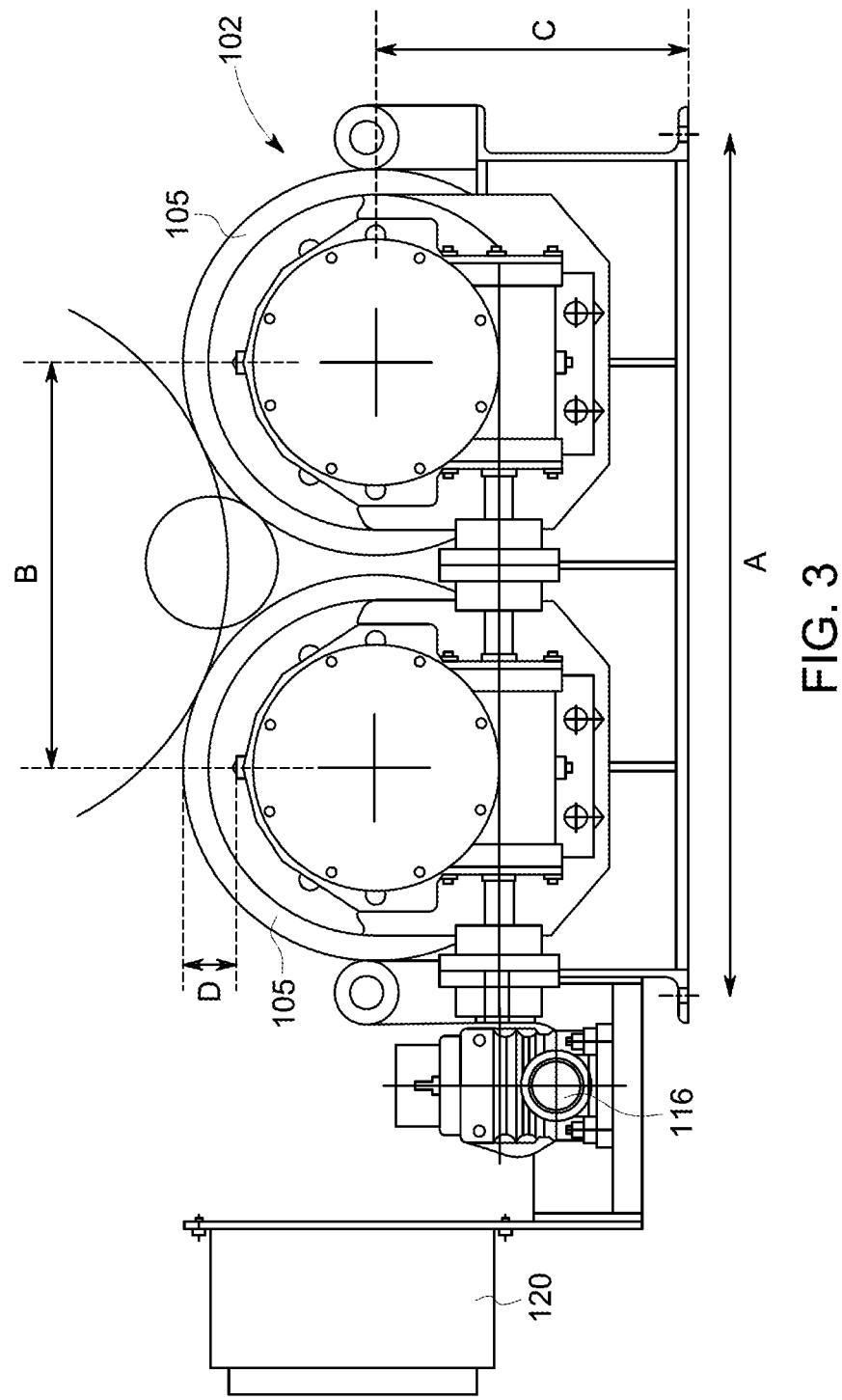
FIG. 3 is a forward-looking-aft view of a roller wheel set of a powered roller stand of FIG. 2.
Figure 4:
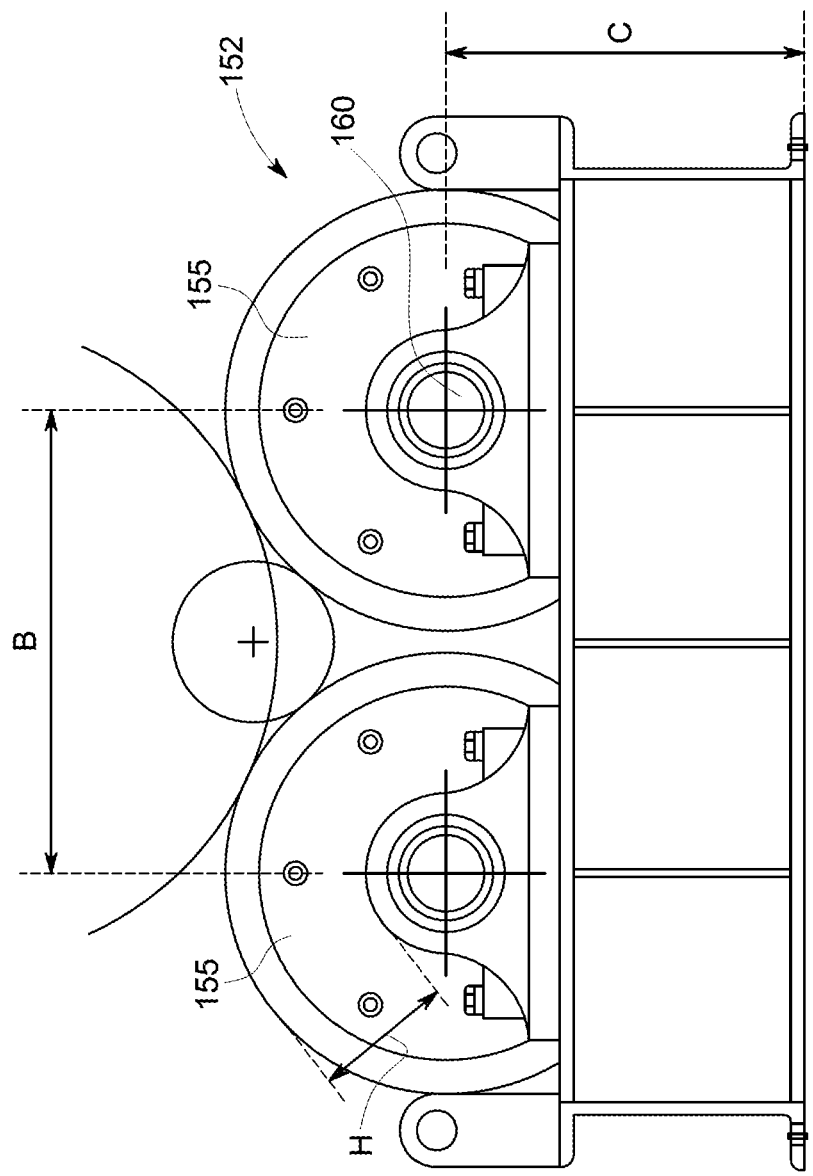
FIG. 4 is a forward-looking-aft view of a roller wheel set of an idler roller stand of FIG. 2.

As shown in FIGS. 2 through 4, each roller stand 100, 150 includes a roller wheel set 102, 152 and one or more stand elements (e.g., 104, 106 and 154, 156) that support the roller wheel modules 102, 152. The roller wheel sets 102, 152 each include a pair of roller wheels 105, 155 that are disposed in a direction transverse to the axial direction defined by the longitudinal axis of the rotor shaft 22. The roller wheels 105 of the powered roller stand 100 (shown in FIG. 3) have the same diameter and rotate about centers that are vertically aligned with one another. The center-to-center distance (dimension "B") is slightly larger than the diameter of the roller wheels 105, creating a small gap between the roller wheels 105. The roller wheels 105 of the powered roller stand 100 are coupled to an electrical motor 116 driven from an electrical enclosure 120.

By way of example and not of limitation, a dimension "A" across the bottom of the roller wheel set 102 may be about 49 inches. A conventional diameter of the roller wheels 105, 155 is about 22 inches, and a conventional gap distance is about 1 inch, resulting in a dimension B of about 23 inches. A dimension "C" from the bottom of the roller wheel set 102 to the center of the rotor wheels 105 may vary between about 16 inches and about 19 inches. A dimension "D," which represents an offset between the roller wheel 105 and a hub 110, is typically about 3 inches.

Likewise, as shown in FIG. 4, the roller wheels 155 of the roller wheel set 152 of the idler roller stand 150 have the same diameter as one another and as the roller wheels 105 of the powered roller stand 100. The roller wheels 155 also define a gap between the roller wheels 155. The roller wheels 155 are idler rollers, meaning that their motion is driven by the rotation of the rotor shaft 22, which is driven by the rotation of the roller wheels 105 of the powered roller stand 100. The offset between the idler roller wheels 155 and a hub 160, represented as dimension "H", is typically between 6.5 inches and 7.5 inches.

As discussed above, to perform routine inspection and maintenance of the rotor shaft 22, the compressor blades 36, and the turbine blades 38, it is necessary that the centerline of the shaft 22 be level (in most cases, parallel to the floor) to prevent the rotor shaft 22 from shifting on, and perhaps falling off, the roller stands 100, 150 when the rotor shaft 22 is spun at low speeds by the powered roller stand 100. The shaft 22 is level when the forward journal bearing 40 and the aft journal bearing 50 are vertically aligned.

Figure 5:
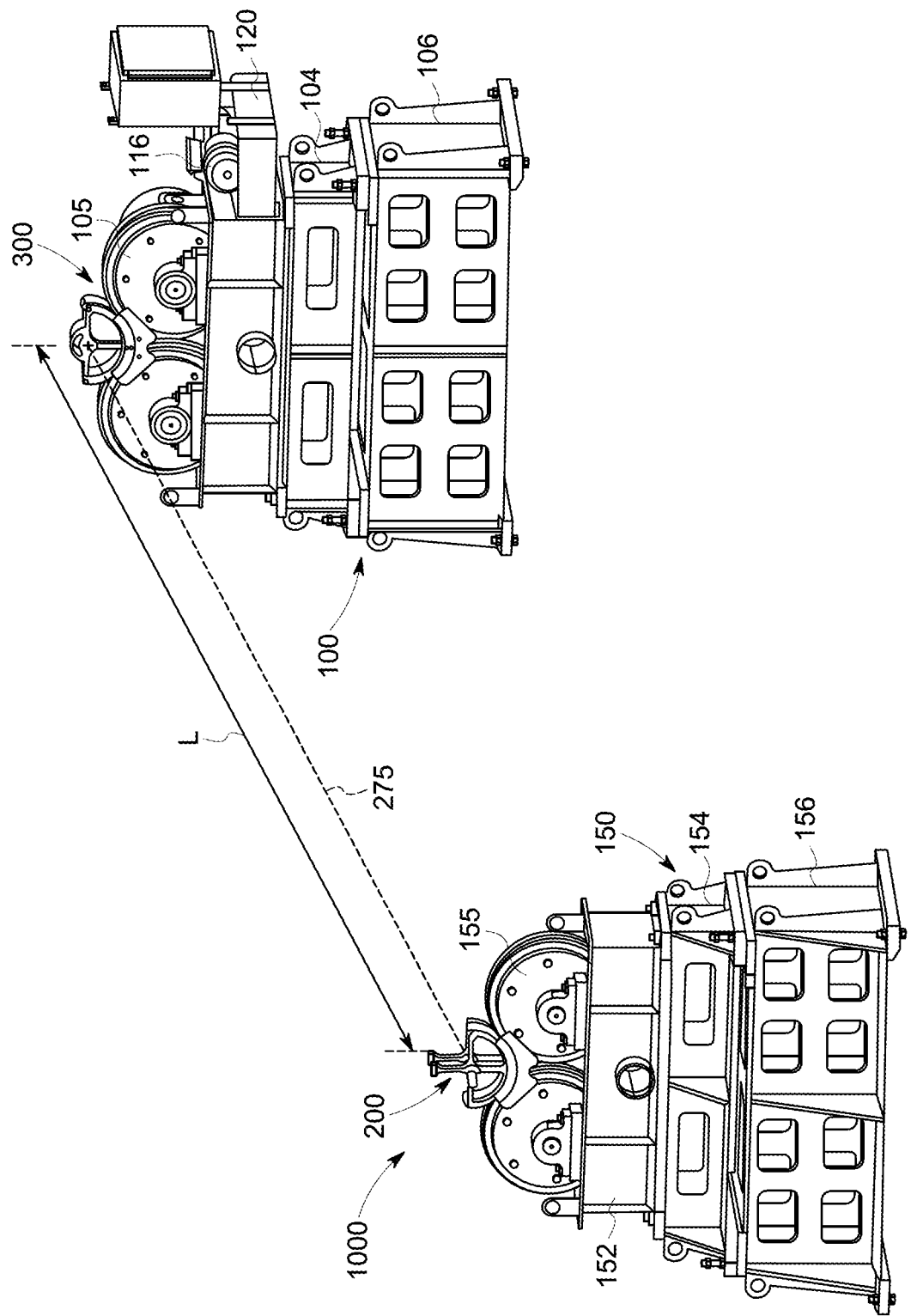
FIG. 5 is a perspective view of the roller stands of FIGS. 2 through 4 and an alignment system of the present disclosure, illustrating the alignment of a laser beam from a laser transmitting unit positioned on a first roller stand to a target unit positioned on a second roller stand, according to an aspect of the present disclosure.

FIG. 5 illustrates one aspect of the present alignment system 1000 (see also FIG. 16), which may be used to ensure the alignment of the roller stands 100, 150, thereby ensuring the alignment of the centerline of the rotor shaft 22 being supported by the roller stands 100, 150. The system 1000 includes a laser transmission unit 200, which is disposed on one of the roller stands (either 100 or 150), and a target unit 300, which is disposed on the other of the roller stands (either 150 or 100, respectively). In the exemplary illustration, the laser transmission unit 200 is mounted to the roller wheels 155 of the idler roller stand 150, while the target unit 300 is mounted to the roller wheels 105 of the powered roller stand 100.

The laser transmission unit 200 includes a laser 270 that projects a laser beam 275 over a distance L to the target unit 300. When the roller stands 100, 150 are aligned vertically and horizontally with one another, the laser beam 260 strikes a defined point (i.e., a center) on the target unit 300, as described further below, and the technician is provided with at least a visual indicator of the successful alignment. For example, the laser beam 260 produces a full circle of light at the center of the target.

Figure 6:
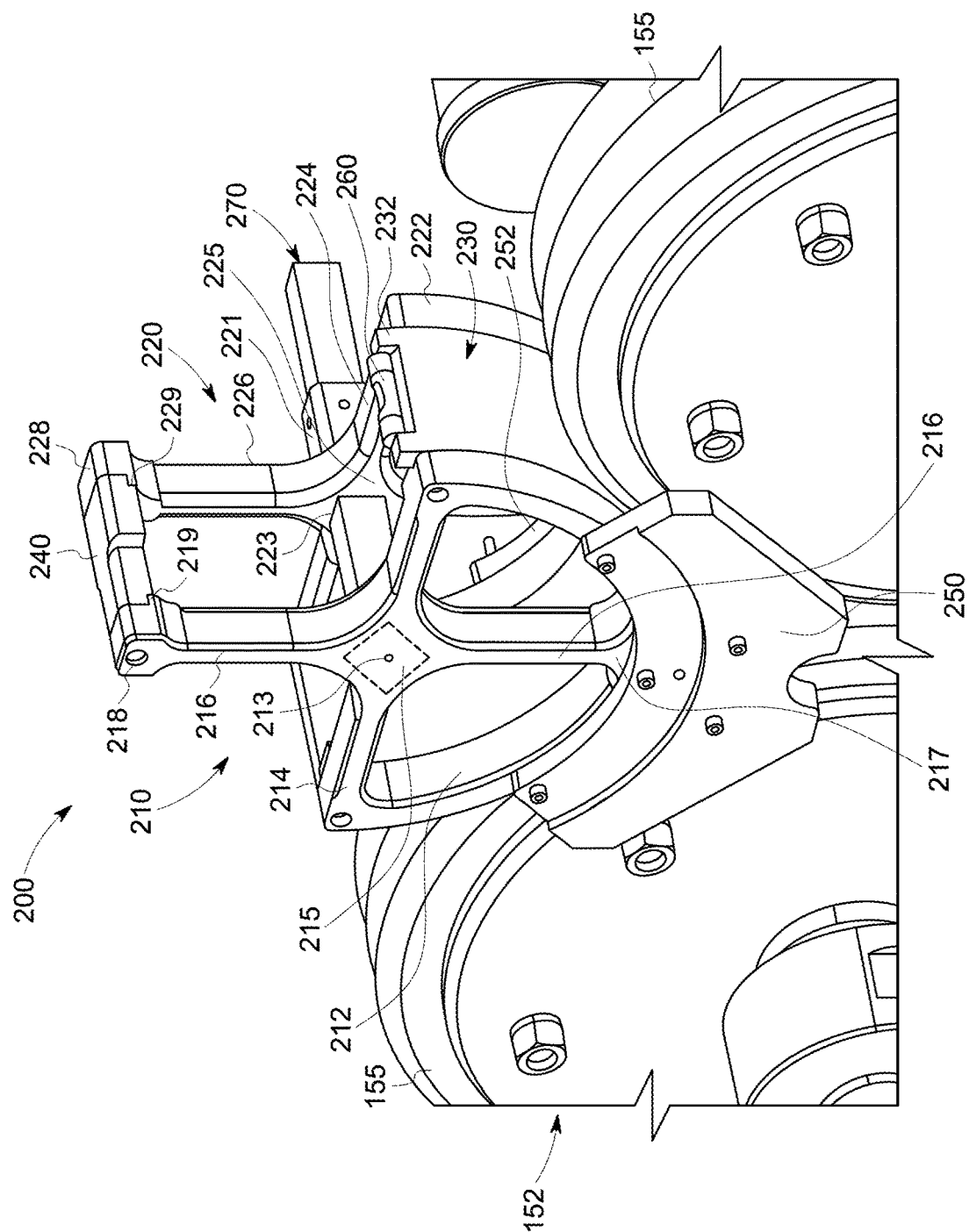
FIG. 6 is a perspective view of the laser transmitting unit of FIG. 5.

FIG. 6 illustrates the laser transmission unit 200, as mounted on the roller wheel set 152 of the roller stand 150. The laser transmission unit 200 includes a front plate 210, a back plate 220 axially spaced from the front plate 210, and an arcuate panel 230 extending axially between the front plate 210 and the back plate 220 and engaging the roller wheels 155. In one embodiment, the arcuate panel 230 may span a 180-degree arc, thus defining a semi-circular profile.

The front plate 210, which faces the target unit 300, includes an arcuate portion 212, a transverse cross-piece 214 connected at each end to the arcuate portion 212, and a vertical portion 216 extending perpendicularly to the transverse cross-piece 214. The vertical portion 216 has a first (proximal) end 217 connected to a midpoint of the arcuate portion 212 and a second (distal) end 218 spaced apart from the transverse cross-piece 214. The intersection of the transverse cross-piece 214 and the vertical portion 216 forms a generally diamond-shaped region 215 through which a small laser transmission hole 213 is defined. In one embodiment, the laser transmission hole 213 has a uniform diameter through the front plate 210. The generally diamond-shaped region 215 may be produced by defining concave curves between the respective segments of the transverse cross-piece 214 and the vertical portion 216.

The front plate 210 is removably attached (for example, using screws at the respective ends of the transverse cross-piece 214) to the arcuate panel 230.

The back plate 220, whose profile is congruent with the front plate 210, includes an arcuate portion 222, a transverse cross-piece 224 connected at each end to the arcuate portion 222, and a vertical portion 226 extending perpendicularly to the transverse cross-piece 224. The arcuate portion 222 spans the same arc (e.g., a semi-circle) as the arcuate portion 212 of the front plate 210, and the transverse cross-piece 224 has the same dimension in the transverse direction as the transverse cross-piece 214 of the front plate 210.

Like the corresponding elements of the front plate 210, the transverse cross-piece 224 and the vertical portion 226 intersect at a generally diamond-shaped region 225, which is produced by defining concave curves between the respective segments of the transverse cross-piece 224 and the vertical portion 226. The generally diamond-shaped region 225 defines an opening 223 therethrough for holding the laser 270. A support collar 221 may project outwardly from the rear surface of the back plate 220 around the perimeter of the opening 223, such that the laser 270 extends through the support collar 221 and the opening 223 and is aligned with the laser transmission hole 213. In the exemplary embodiment, the opening 223 and the support collar 221 define a square shape, but other shapes may be used to accommodate lasers 270 having different cross-sectional profiles.

The back plate 220 is removably attached (for example, using screws at the respective ends of the transverse cross-piece 224) to the arcuate panel 230 opposite the front plate 210.

In an exemplary embodiment, the laser 270 is a single dot, Class IIIA type laser, which may emit either red or green light and which may be provided with an adjustable beam diameter (via an aperture). This lightweight laser 270 may be battery operated and may transmit a laser beam over distances of up to 100 feet. Class IIIA lasers are relatively safe for eye exposure and are not a skin or materials burn hazard. However, typical safety precautions should be followed when the laser 270 is operational, including avoiding direct eye exposure to the laser beam 275, avoiding looking directly into reflections of the laser beam 275, and avoiding viewing the laser beam 275 with optical or magnifying devices or equipment. An exemplary, non-limiting laser device 270 for this purpose is the Model L100M, series MX Laser Precision Level, which is commercially available from Laser Tools Co., Inc., of Little Rock, Ark., although comparable devices may be available from other manufacturers.

A distal end 228 of the vertical portion 226 of the back plate 220 is coupled to the distal end 218 of the vertical portion 216 of the front plate 210, using a spacer block 240 secured with screws or other fasteners. The spacer block 240 may rest upon, or interlock with, a first ledge 219 projecting from the rear surface of the distal end 218 of the vertical portion 216 of the front plate 210 and/or a second ledge 229 projecting from the front surface of the distal end 228 of the vertical portion 226 of the back plate 220.

The laser alignment unit 200 further includes a front locking plate 250, which is removably attached to the arcuate portion 212 of the front plate 210, and a rear locking plate 252, which is removably attached to the arcuate portion 222 of the back plate 220. The locking plates 250, 252 are sized and shaped to secure the laser alignment unit 200 to the roller wheels 155. The locking plates 250, 252 may be interchanged with locking plates 250, 252 of different sizes to accommodate roller wheels 155 of different diameters and offsets.

Optionally, the laser alignment unit 200 may include a level 260 or another position detector (such as an inclinometer or tilt sensor) to assist the technician in positioning the laser alignment unit 200 squarely on the roller wheel set 152 and in achieving alignment with the target unit 300. In the exemplary illustrated embodiment, the arcuate panel 230 may be provided with upwardly extending projections 232 between which the level 260 may be mounted. In an alternate arrangement, the projections 232 may extend outward from the outer surface of the arcuate panel 230 and the level 260 (or other device) may be positioned in parallel to the laser 270.

Figure 7:
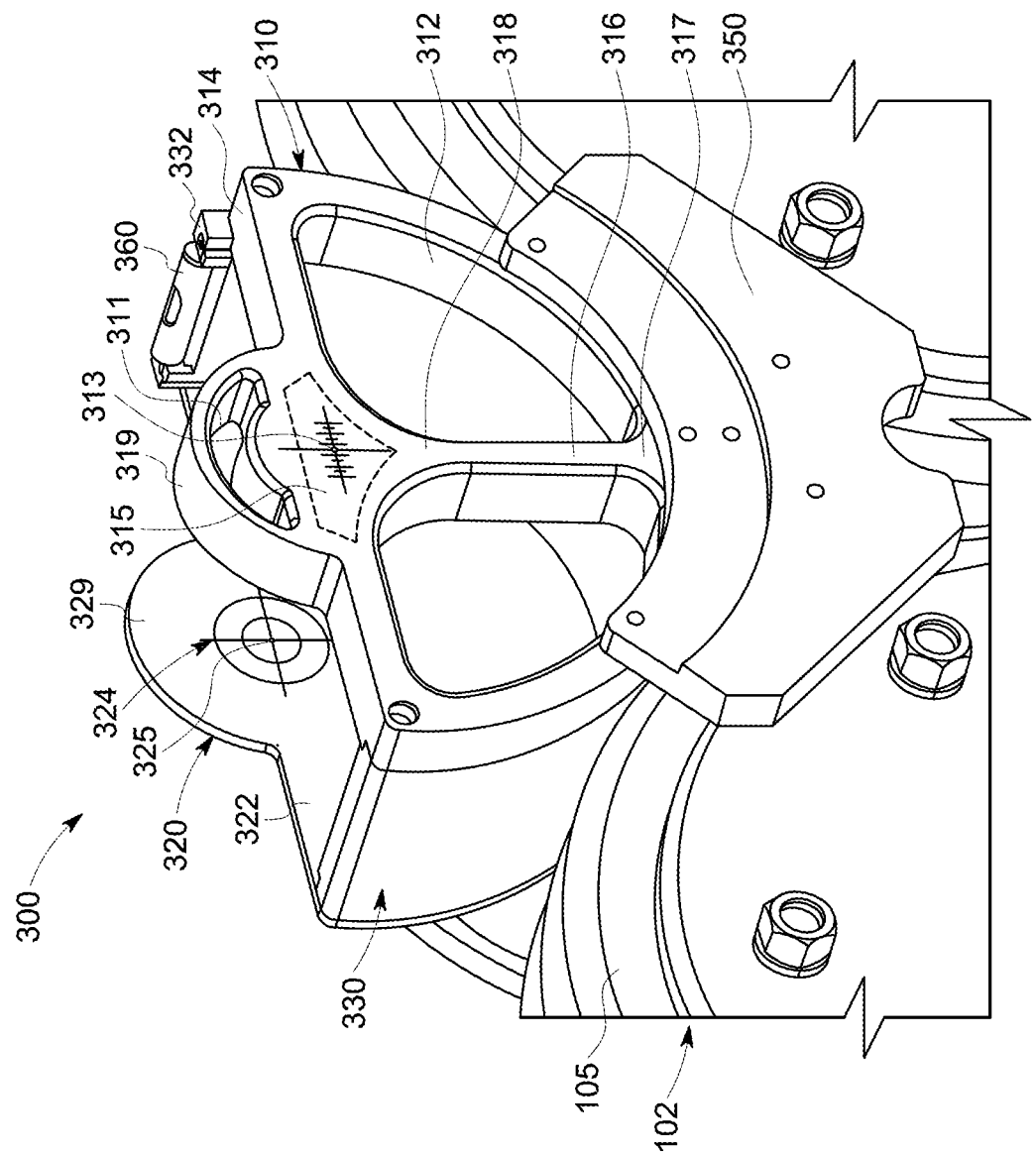
FIG. 7 is a perspective view of the target unit of FIG. 5.

FIG. 7 illustrates the target unit 300, as mounted on the roller wheel set 102 of the roller stand 100. The target unit 300 includes a front plate 310, a back plate 320 axially spaced from the front plate 310, and an arcuate panel 330 extending axially between the front plate 310 and the back plate 320 and engaging the roller wheels 105. In one embodiment, the arcuate panel 330 may span a 180-degree arc, thus defining a semi-circular profile. The front plate 310 and the back plate 320 are removably attached to the arcuate panel 330, for example, using screws or other fasteners.

The front plate 310, which faces the laser alignment unit 200, includes a primary arcuate portion 312, a transverse cross-piece 314 connected at each end to the arcuate portion 312, a vertical portion 316 extending perpendicularly to the transverse cross-piece 314, and a secondary arcuate portion 319 having a smaller diameter than the primary arcuate portion 312. The vertical portion 316 has a first end 317 connected to a midpoint of the primary arcuate portion 312 and a second end 318 connected to an intersection region 315 at the midpoint of the transverse cross-piece 314.

The primary arcuate portion 312 defines a semi-circular shape that opens away from the roller wheels 105, while the secondary arcuate portion 319 defines a semi-circular shape that opens in the direction of the roller wheels. The secondary arcuate portion 319 is connected at each end to the transverse cross-piece 314 and is centered with the vertical portion 316 and may define an opening 311 between an outermost edge of the secondary arcuate portion 319 and the transverse cross-piece 314. The opening 311, which may also be semi-circular or arcuate, may enable the secondary arcuate portion 319 to function as a handle to facilitate carrying the target unit 300.

An intersection of the transverse cross-piece 314, the vertical portion 316, and the secondary arcuate portion 319 forms a generally pentagonal region 315 through which a small laser transmission hole 313 is defined. The intersection region 315 may be produced by defining concave curves between the respective segments of the transverse cross-piece 314 and the vertical portion 316.

Figure 8:
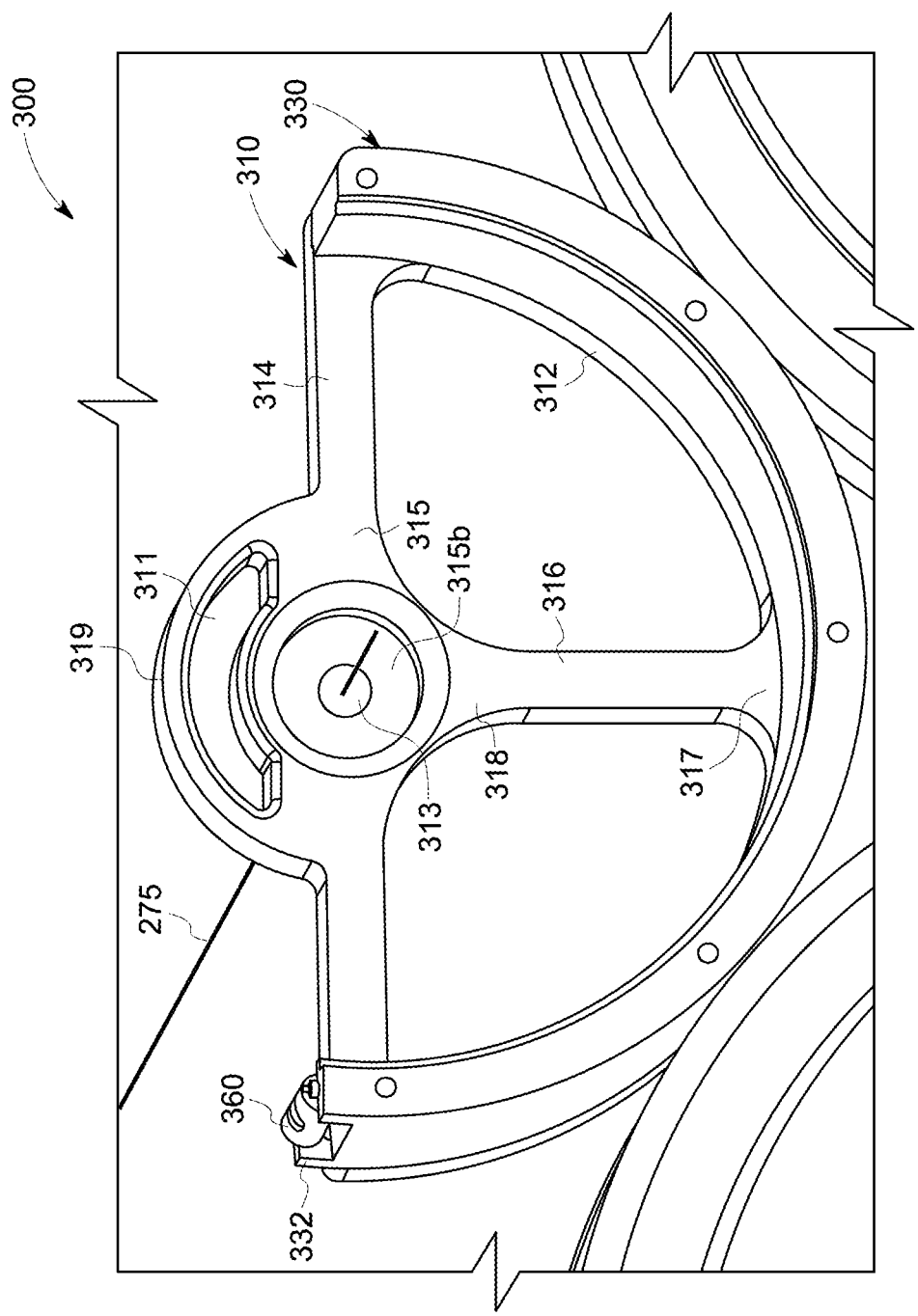
FIG. 8 is an aft-looking-forward perspective view of a portion of the target unit of FIGS. 5 and 7, illustrating the transmission of a laser beam through a forward plate of the target unit.
Figure 9:
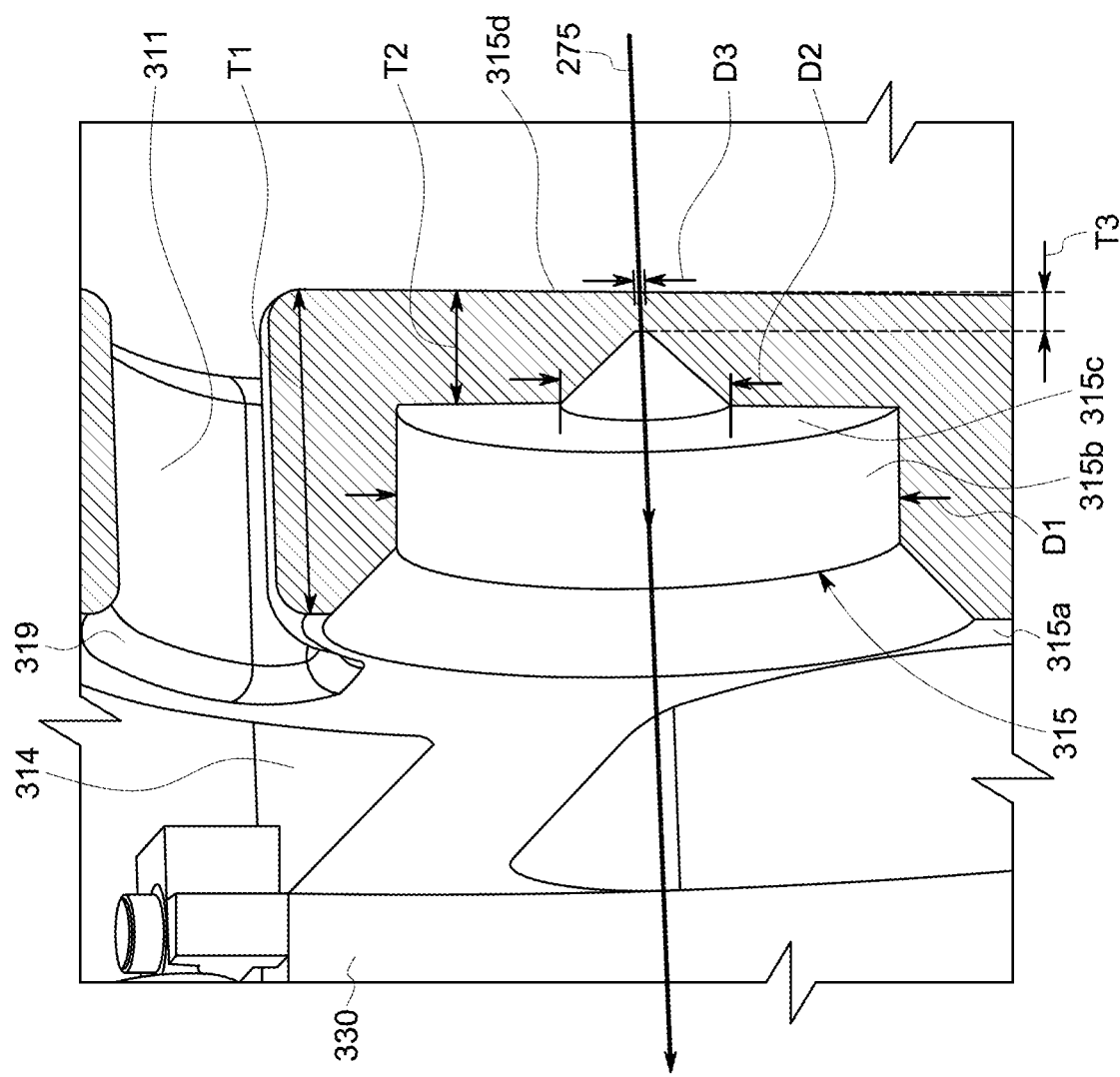
FIG. 9 is an enlarged, partial cross-sectional view of the target unit of FIGS. 5, 7, and 8, illustrating the alignment of a laser beam through the forward plate of the target unit.

As shown in FIGS. 8 and 9, the rear surface of the intersection region 315 is provided with a recess area 315b. The intersection region 315 has a first thickness T1 at its perimeter, the thickness T1 being equal to the thickness of the transverse cross-piece 314 and the vertical portion 316. The intersection region 315 tapers inwardly from the rear surface 315a to a recess area 315b of uniform diameter D1. The surface 315c at the base of the recess area 315b is axially spaced from a front surface 315d of the intersection region 315, such that the center of the intersection region 315 (having a diameter equal to diameter D1 of the recess area 315b) has a thickness T2, which is significantly less than the thickness T1 of the intersection region 315 at its perimeter.

The laser transmission hole 313 defined through the intersection region has a first diameter D2 on the front surface 315d of the front plate 310 and a second, larger diameter D3 on the rear surface 315c defined by the recess area 315b, thereby creating a generally conical hole. In the exemplary embodiment, the laser transmission hole 313 has a funnel shape, in which the hole 313 having a first diameter D2 extends inwardly from the front surface 315d for a short distance T3 (e.g., 0.125 inches) before the diameter begins to increase uniformly to a second diameter D3 on the rear surface 315c. By providing the intersecting region 315 with a thin wall thickness (that is, the T3 distance described above) at the location of the laser transmission hole 313, the alignment system 1000 produces more accurate measures of the pitch and yaw of the roller stand(s) 100 and/or 150. Moreover, the conical shape of the hole 313, as the diameter increases from D2 to D3, ensures that the laser beam 275 will pass unimpeded through the front plate 310.

Figure 10:
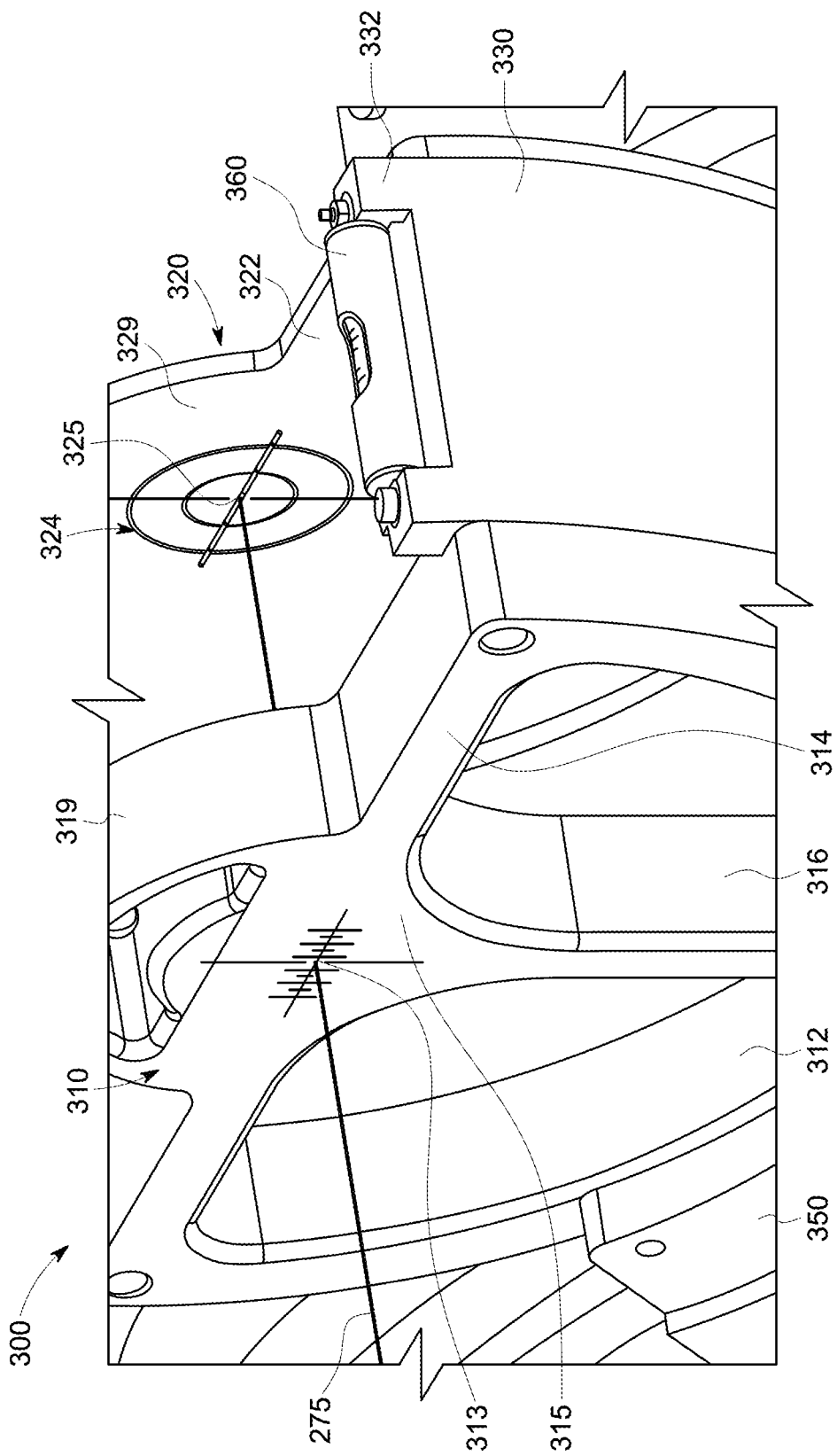
FIG. 10 is a forward-looking-aft perspective view of a laser beam being transmitted through the target unit of FIGS. 5 and 7-9.

Referring again to FIG. 7 and simultaneously to FIG. 10, the target unit 300 further includes a back plate 320. The back plate 320 is a solid plate having a primary arcuate portion 322 and a secondary arcuate portion 329 continuous and integral with the primary arcuate portion 322. The primary arcuate portion 322 has a generally semi-circular profile that corresponds to the shape of the arcuate panel 330. The secondary arcuate portion 329 likewise has a generally semi-circular profile, in which the radius of the semi-circle is smaller than that of the primary arcuate portion 322. The primary arcuate portion 322 is oriented in a first direction, while the secondary arcuate portion 329 is oriented in an opposite second direction. As illustrated, the profiles of the front plate 310 and the back plate 320 are congruent.

A forward surface of the back plate 320 includes a target 324 that is engraved, printed, or otherwise produced thereon. A center 325 of the target 324 aligns with the laser transmission hole 313, such that a laser beam 275 passing directly through the laser transmission hole 313 strikes the center 325 of the target 324. In the event that the laser beam 275 contacts some point on the target 324 other than the center 325, the technician performing the alignment recognizes that further adjustments to the roller stand(s) 100, 150 are required.

The target unit 300 further includes a front locking plate 350 (as in FIGS. 7 and 10), which is removably attached to the arcuate portion 312 of the front plate 310, and a rear locking plate 352 (as in FIG. 9), which is removably attached to the arcuate portion 322 of the back plate 320. The locking plates 350, 352 are sized and shaped to secure the target unit 300 to the roller wheels 105. The locking plates 350, 352 may be interchanged with locking plates 350, 352 of different sizes to accommodate roller wheels 105 of different diameters and offsets.

Optionally, the target unit 300 may include a level 360 or another position detector (such as an inclinometer or tilt sensor) to assist the technician in positioning the target unit 300 squarely on the roller wheel set 102 and in achieving alignment with the laser transmission unit 200. In the exemplary illustrated embodiment, the arcuate panel 330 may be provided with upwardly extending projections 332 between which the level 360 may be mounted. In an alternate arrangement, the projections 332 may extend outward from the outer surface of the arcuate panel 330 and the level 360 (or other device) may be positioned in parallel to the path of the laser beam 275, when the units 200, 300 are aligned.

Figure 11:
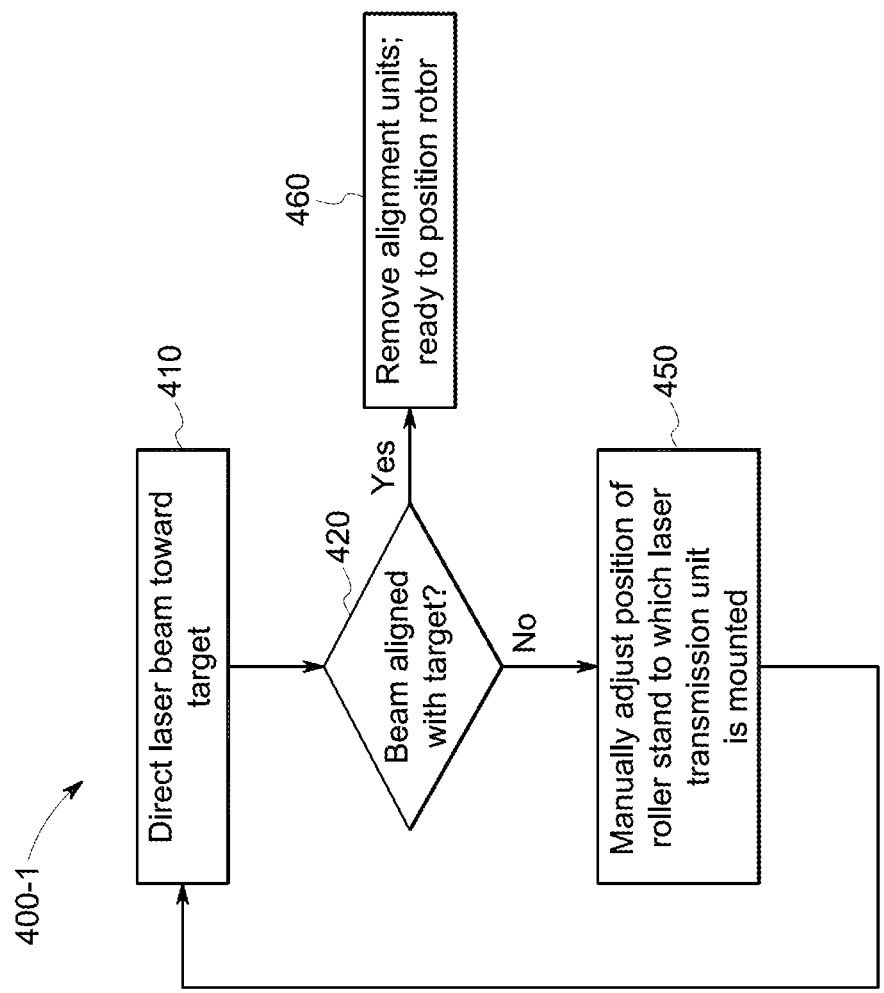
FIG. 11 is a flow diagram describing the use of the laser transmitting unit and the target unit of the present alignment system, according to one aspect provided herein.

FIG. 11 provides a flowchart of an exemplary process 400-1 for using the laser transmission unit 200 and the target unit 300 of the present alignment system 1000. In step 410, the laser beam 275 from the laser transmission unit 200 is directed toward the target 324 of the target unit 300. In step 420, the target 324 is checked to determine if the laser beam 275 is perfectly aligned with the center 325 of the target 324. In step 460, if the laser beam 275 is perfectly aligned with the center 325 of the target 324, then the alignment units 200, 300 may be removed from the respective roller stands 100, 150, and the roller stands 100, 150 are ready to receive the rotor 22. In step 450, if the laser beam 275 is not perfectly aligned with the center 325 of the target 324, the technician manually adjusts the position of the roller stand (e.g., stand 100) to which the laser transmission unit 200 is mounted.

Figure 12:
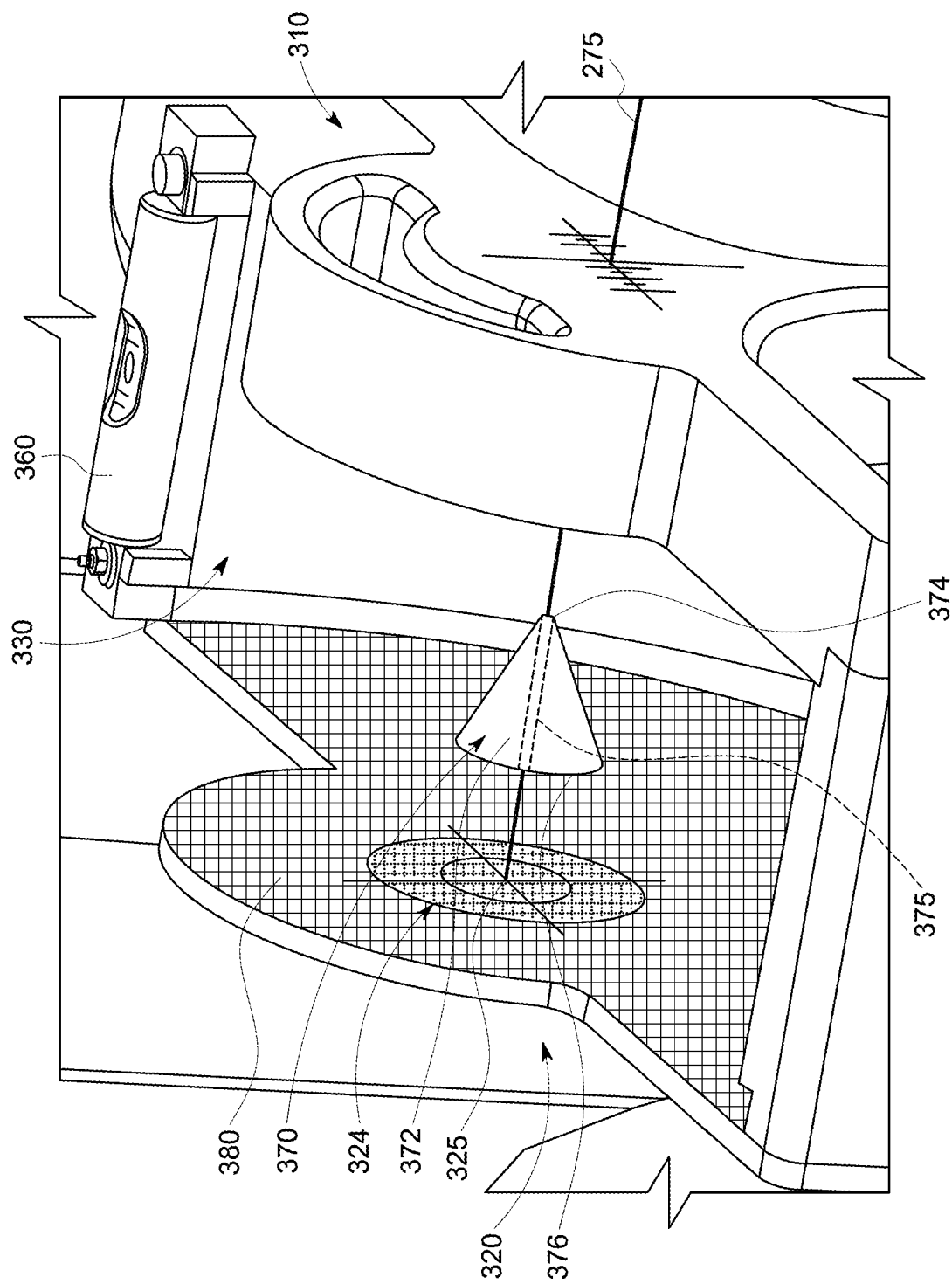
FIG. 12 is a perspective view of an alternate embodiment of the target unit of FIG. 7, further including a conical mirror and a laser beam sensing screen, in which the laser beam is aligned with a target of the target unit.
Figure 13:
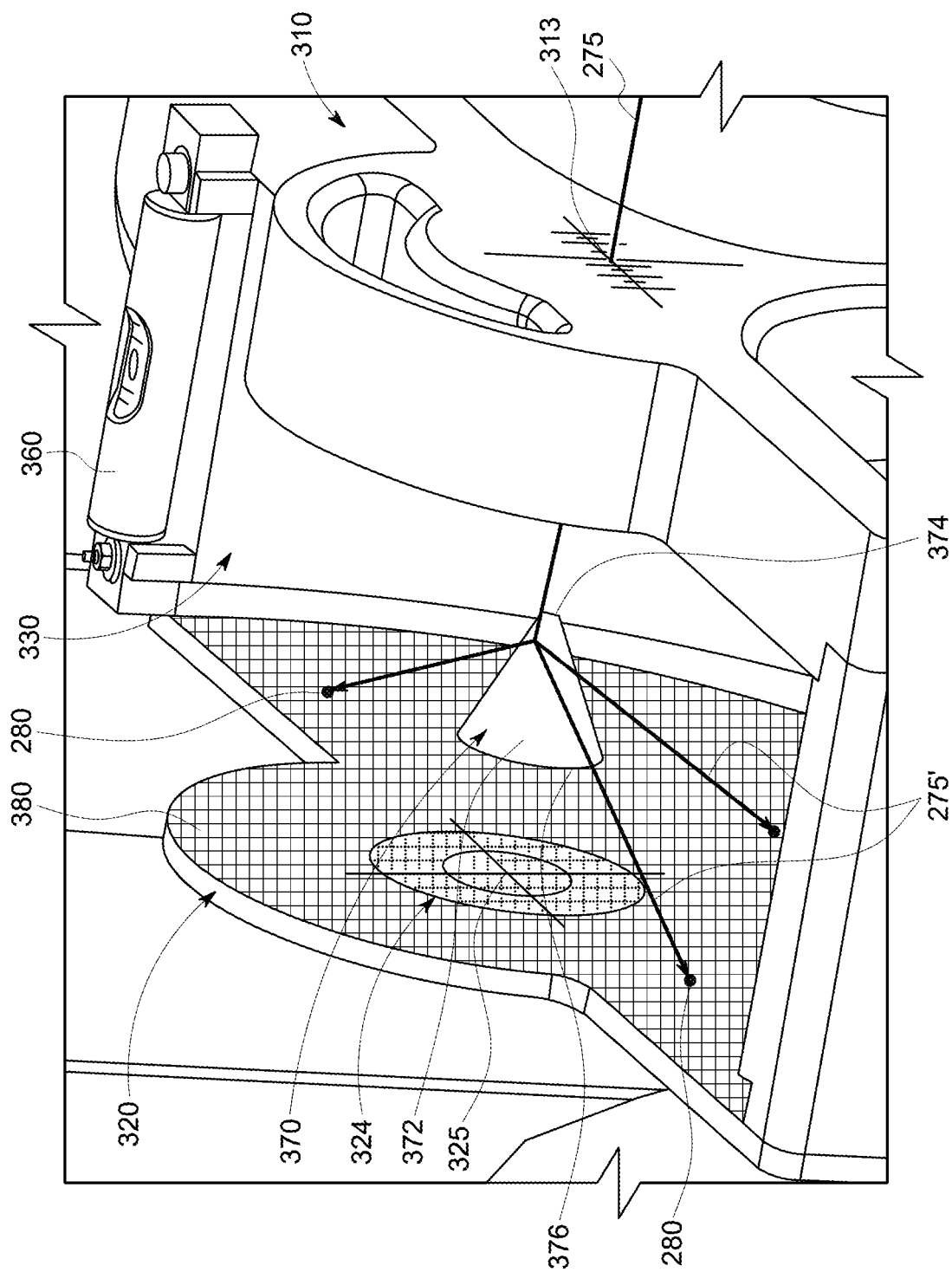
FIG. 13 is a perspective view of the alternate embodiment of FIG. 12, in which the laser beam is misaligned with the target of the target unit.
Figure 14:
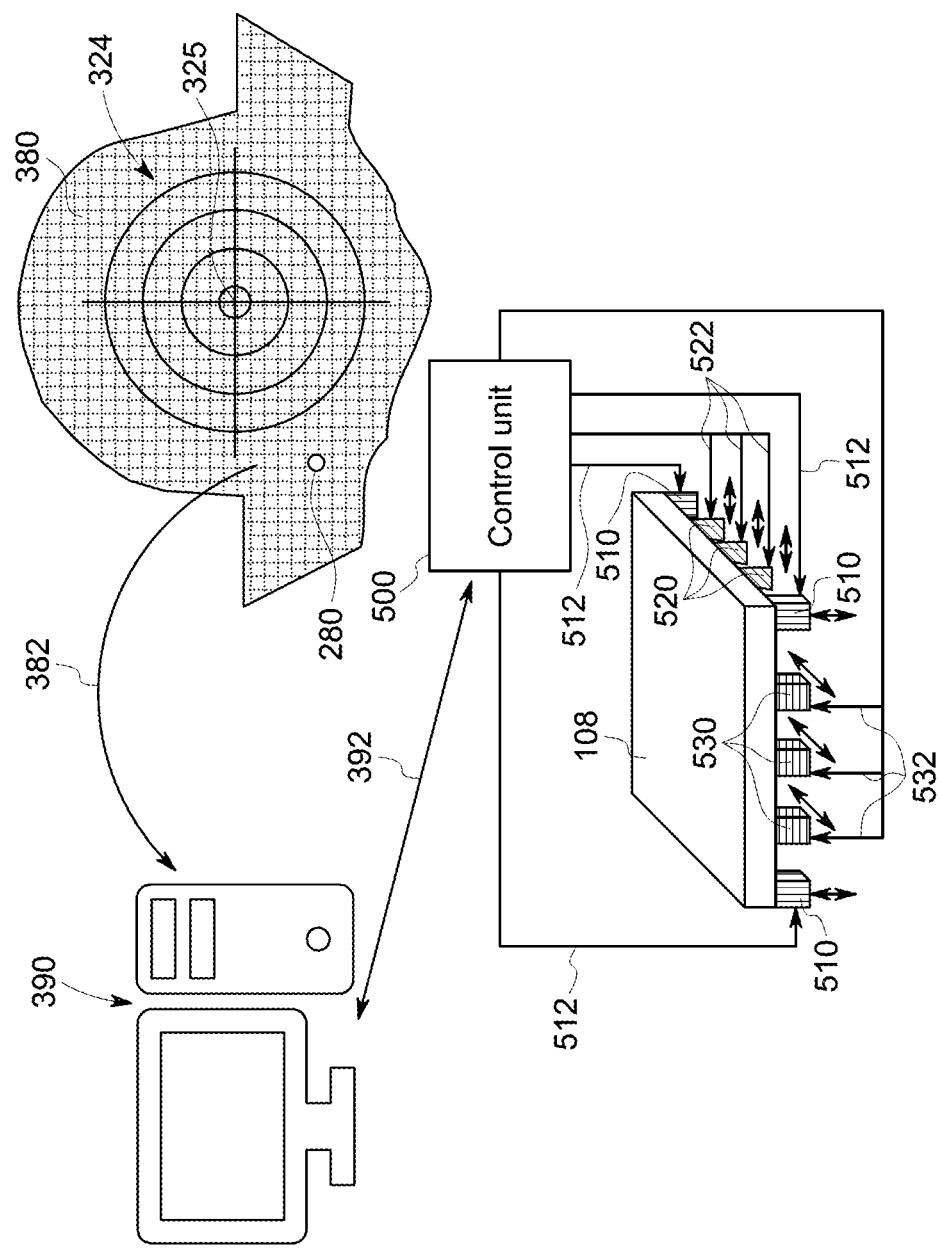
FIG. 14 is a schematic representation of another aspect of the present alignment system, in which signals from the laser beam sensing screen of FIG. 12 are processed by a computer and in which the computer provides signals to a control unit for actuation of hydraulic cylinders coupled to a roller stand platform.

FIGS. 12 and 13 illustrate an automated version of the present alignment system 1000, which uses a laser beam sensing screen 380 attached to the back plate 320 of the target unit 300. The laser beam sensing screen 380 is in electronic communication with a computing device 390 (e.g., a computer or tablet computer), as shown in FIG. 14.

According to one embodiment of the automated system, a conical mirror 370 is mounted between the front plate 310 and the back plate 320 of the target unit 300 (mounting hardware not shown). The conical mirror 370 has a reflective body 372, a tip 374, and a base 376 opposite the tip. An aperture 375 extends through the reflective body 372 from the tip 374 to the base 376. Alternately, the conical mirror 370 may be hollow, and the base 376 may instead be a plane that defines the base of the conical shape of the reflective body 372.

When installed, the tip 374 is proximate to the front plate 310, the base (or base plane) 376 is proximate to the back plate 320, and the aperture 375 is aligned with the laser transmission hole 313 in the front plate 310 and the center 325 of the target 324 on the back plate 320. The aperture 375 provides a passage for the laser beam 275 to reach the center 325 of the target 324 (as shown in FIG. 12).

However, when the laser beam 275 is not aligned with the center 325 of the target 324 (as shown in FIG. 13), the laser beam 275 reflects off the reflective body 372 of the conical mirror 370. The reflected laser beam 275' makes contact with the laser beam sensing screen 380 at a sensed position 280.

As shown in FIG. 14, the laser beam sensing screen 380 communicates the sensed position(s) 280 of the reflected laser beams 275' as one or more signals 382, which are transmitted (wirelessly or through wired connections) to a computing device 390 (such as a computer or tablet computer). The computing device 390 is programmed to convert the signal(s) 382 to determine the axial trajectory of the laser beam 275 (see FIG. 15), as the laser beam 275 exits the laser transmission hole 313 in the front plate 310. Optionally, the axial trajectory of the laser beam 275 may be plotted on a data display 600 presented by the computing device 390 for viewing by the technician (see FIG. 15).

In some embodiments, the laser beam sensing screen 280 may be used without the conical mirror 370. In these instances, the laser beam 275 is directed through the laser transmission hole 313 in the front plate 310 and strikes the laser beam sensing screen 280 directly. The laser beam sensing screen 380 may transmit a signal 382 to the computing device 390 to determine whether the laser beam 275 is aligned with the center 325 of the target 324.

The computing device 390 may be in electronic communication with a control unit 500 for a hydraulically actuated roller stand platform 108. The roller stand platform 108 may be positioned beneath the stand elements 104, 106, or may replace one of or both the stand elements 104, 106 (shown in FIG. 5). The roller stand platform 108 may include a first set of hydraulic cylinders 510, a second set of hydraulic cylinders 520, and a third set of hydraulic cylinders 530. The first set of hydraulic cylinders 510 are positioned at the corners of the roller stand platform 108 and are used to adjust the vertical height of the roller stand platform 108. The second set of hydraulic cylinders 520 are spaced along a first pair of opposing sides of the roller stand platform 108 and are used to adjust the axial position of the roller stand platform 108. The third set of hydraulic cylinders 530 are spaced along a second pair of opposing sides of the roller stand platform 108 and are used to adjust the transverse position of the roller stand platform 108. The number of cylinders in each set may vary from the number illustrated in the exemplary drawing.

The control unit 500 transmits signals 512, 522, 532 to the individual hydraulic cylinders of the first set of hydraulic cylinders 510, the second set of hydraulic cylinders, and the third set of hydraulic cylinders 530, respectively. Each hydraulic cylinder of the sets 510, 520, 530 may be independently operated to achieve a full range of motion in the X-Y-Z directions (i.e., axially, vertically, and transversely).

It is contemplated that the roller stand platform 108 is advantageously used in conjunction with the roller stand 100, 150 on which the laser transmission unit 200 is mounted. Alternately, both the roller stand 100 and the roller stand 150 may be provided with a hydraulically actuated roller stand platform 108.

Figure 15:
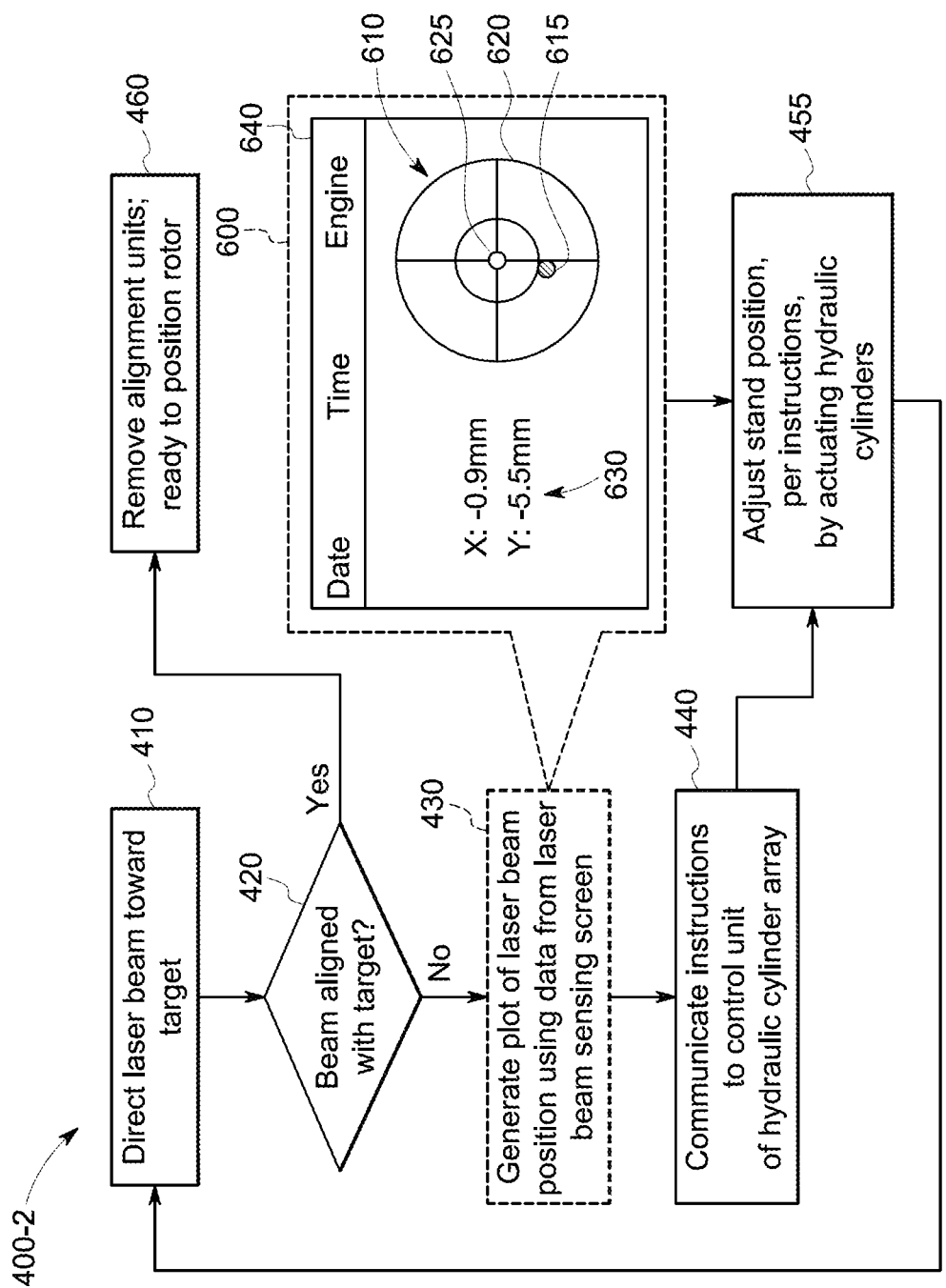
FIG. 15 is a flow diagram describing the process of automatically adjusting the position of the roller stand using hydraulic cylinders, as shown in FIG. 14.

FIG. 15 provides a flowchart of a second exemplary process 400-2 for using the laser transmission unit 200 and the target unit 300 of the present alignment system 1000. In step 410, the laser beam 275 from the laser transmission unit 200 is directed toward the target 324 of the target unit 300. In step 420, the target 324 is checked to determine if the laser beam 275 is perfectly aligned with the center 325 of the target 324. This step may be performed manually by the technician or automatically by the computer 390 based on signals 382 from the laser beam sensing screen 380. In step 460, if the laser beam 275 is perfectly aligned with the center 325 of the target 324, then the alignment units 200, 300 may be removed from the respective roller stands 100, 150, and the roller stands 100, 150 are ready to receive the rotor 22.

In optional step 430, a plot 610 of the axial trajectory 615 of the laser beam 275 relative to the center 325 of the target 324 is produced, using a computer 390 (or similar computing device, such as a tablet computer) configured with a program for such purpose. The position of the laser beam 275 may be ascertained, based on its axial trajectory, using data provided by the laser beam sensing screen 280 (shown in FIGS. 12 and 13). The plot 610 of the position 615 of the laser beam 275, relative to the center 625 of a simulated target 620, may be part of a visual data display 600, viewable on the computer 390 (or another device, such as a tablet computer). The visual data display 600 may further include a quantification 630 of the position of the laser beam 275 and bibliographic information 640, such as the date and time of the measurement and identifying information for the engine from which the rotor 22 is taken.

In step 440, if the laser beam 275 is not perfectly aligned with the center 325 of the target 324, the computer 390 transmits instructions 392 to the control unit 500 of the hydraulically actuated roller stand platform 108.

In step 450, one or more of the first set of hydraulic cylinders 510, the second set of hydraulic cylinders 520, and the third set of hydraulic cylinders 530 adjusts the position of the roller stand platform 108 (e.g., supporting roller stand 100) to which the laser transmission unit 200 is mounted.

The process 400-2 repeats until the laser beam 275 is aligned with the center 325 of the target 324.

FIG. 16 illustrates the present alignment system 1000, which includes the laser alignment unit 200 and the target unit 300. Optionally, for automated alignment of one or more of the roller stands 100, 150, the system 1000 may further include a computer 390 (or other computing device), a control unit 500 in electronic communication with the computer 390, and a hydraulically actuated roller stand platform 108 with sets of hydraulic cylinders 510, 520, 530 in electronic communication with the control unit 500. When automating the alignment process, the target unit 300 may be provided with a laser beam sensing screen 380 applied to the back plate 320 to detect the position of the laser beam 275. Further still, the target unit 300 may include a conical mirror 370 positioned between the front plate 310 and the back plate 320.

The laser alignment unit 200 and the target unit 300 may have components (e.g., front plate, back plate, arcuate panel) that are separate components joined together by fasteners, such as screws or interlocking tabs. The components may be produced from plastic or metal using additive manufacturing techniques or conventional methods, such as casting, molding, or other fabrication techniques.

As described herein, the present alignment system and method significantly reduce the time, effort, and manpower required to successfully align a pair of opposing roller stands, so that a gas turbine rotor may be inspected or serviced external to the gas turbine casing. The laser transmission unit and the target unit includes components that are readily joined together and to the respective roller stands. The laser transmission unit and the target unit are lightweight and readily portable. A single technician is able to perform the alignment method using the present alignment system in a matter of minutes, in sharp contrast to the multiple hours required for two technicians to complete an alignment using conventional techniques.

Exemplary embodiments of the present alignment system and methods of using the same are described above in detail. The methods and system described herein are not limited to the specific embodiments described herein, but rather, components of the methods and system may be utilized independently and separately from other components described herein. For example, the methods and system described herein may have other applications not limited to practice with power-generating gas turbines, as described herein. Rather, the methods and system described herein can be implemented and utilized in various other industries.

While the technical advancements have been described in terms of various specific embodiments, those skilled in the art will recognize that the technical advancements can be practiced with modification within the spirit and scope of the claims.

What is claimed is:

1. An alignment system comprising:
   a laser transmission unit configured for engagement with a first roller stand, the laser transmission unit comprising:
      a first front plate defining a first laser transmission hole therethrough,
      a first back plate axially spaced from the first front plate,
      a first arcuate panel extending axially between the first front plate and the first back plate and being configured to contact a first pair of roller wheels of the first roller stand, and
      a laser centrally mounted through the first back plate and extending to the first front plate, such that a laser beam produced by the laser is transmitted through the first laser transmission hole of the first front plate; and
   a target unit configured for engagement with a second roller stand axially spaced from the first roller stand, the target unit comprising:
      a second front plate defining a second laser transmission hole therethrough,
      a second back plate axially spaced from the second front plate and being provided with an image of a target, the target having a center aligned with the second laser transmission hole, and
      a second arcuate panel extending axially between the second front plate and the second back plate and being configured to contact a second pair of roller wheels of the second roller stand;
   wherein, when a laser beam from the laser transmission unit passes through the second laser transmission hole of the second front plate and reaches the center of the target on the second back plate, the first roller stand and the second roller stand are aligned.

2. The system of claim 1, wherein the first front plate and the first back plate each comprise a first arcuate portion having a shape matching a first profile of the first arcuate panel, a transverse cross-piece extending across the first arcuate portion, and a vertical portion extending from a midpoint of the first arcuate portion through the midpoint of the transverse cross-piece, thereby forming an intersection region, the first laser transmission hole being defined through the intersection region of the first front plate and the laser being mounted through the intersection region of the first back plate.

3. The system of claim 2, wherein the first back plate defines an opening through which the laser is mounted; and wherein a support collar extends from a rear surface of the back plate around the opening, the support collar being configured to hold the laser.

4. The system of claim 2, wherein the vertical portion of the first front plate and the vertical portion of the first back plate extend beyond the intersection region; and wherein a spacer block extends axially between an end of the vertical portion of the first front plate and a respective end of the vertical portion of the first back plate.

5. The system of claim 1, wherein the laser is a single-dot, Class IIIA laser.

6. The system of claim 1, wherein the first laser transmission hole has a uniform diameter.

7. The system of claim 1, wherein the laser transmission unit further comprises a first front locking plate and a first rear locking plate, the first front locking plate being removably coupled to the first front plate and the first rear locking plate being removably coupled to the first back plate.

8. The system of claim 1, wherein the laser transmission unit further comprises a first level attached to the first arcuate panel.

9. The system of claim 1, wherein the second front plate of the target unit comprises a second arcuate portion having a shape matching a second profile of the second arcuate panel, a transverse cross-piece extending across the second arcuate portion, and a vertical portion extending from a midpoint of the second arcuate portion to the transverse cross-piece, thereby forming an intersection region, the second laser transmission hole being defined through the intersection region of the second front plate.

10. The system of claim 9, wherein the intersection region of the second front plate comprises a perimeter having a first thickness, a recessed area radially inward of the perimeter and extending axially inward from a rear surface of the intersection region, and a central area extending axially between the recessed area and a front surface of the intersection region, the central area having a second thickness less than the first thickness; and wherein the second laser transmission hole is defined through the central area.

11. The system of claim 10, wherein the second laser transmission hole comprises a cylindrical hole portion having a first diameter and extending inwardly from the front surface and a conical hole portion whose diameter increases from the first diameter to a second diameter at the rear surface of the intersection region, thereby defining a funnel-shaped hole.

12. The system of claim 9, wherein the second back plate of the target unit comprises a primary arcuate portion and a secondary arcuate portion integral with the primary arcuate portion, the primary arcuate portion having a shape and a first diameter corresponding to a profile of the second arcuate panel, and the secondary arcuate portion having a second diameter smaller than the first diameter; and wherein the target is disposed across the primary arcuate portion and the secondary arcuate portion.

13. The system of claim 1, wherein the target unit further comprises a second front locking plate and a second rear locking plate, the second front locking plate being removably coupled to the second front plate and the second rear locking plate being removably coupled to the second back plate.

14. The system of claim 1, further comprising a laser beam sensing screen disposed over a front surface of the second back plate, the laser beam sensing screen being configured to detect a location at which the laser beam contacts laser beam sensing screen; and a computing device configured to receive signals from the laser beam sensing screen and to quantify the location relative to the center of the target.

15. The system of claim 14, further comprising a conical mirror disposed between the second front plate and the second back plate of the target unit, the conical mirror having a reflective body with a tip and a base, the reflective body defining an aperture extending through the tip and the reflective body along a longitudinal axis of the conical mirror, the conical mirror being oriented such that the tip is proximate to the front plate of the target unit and the base is proximate to the back plate of the target unit; and wherein, when the laser beam strikes the conical mirror at a location other than the aperture, the reflective body deflects the laser beam onto the laser beam sensing screen.

16. The system of claim 14, further comprising a roller stand platform disposed beneath at least one of the first roller stand and the second roller stand; and wherein the system further comprises, disposed beneath and in contact with the roller stand platform, a first plurality of hydraulic cylinders configured to adjust a vertical height of the roller stand platform, a second plurality of hydraulic cylinders configured to adjust an axial position of the roller stand platform, and a third plurality of hydraulic cylinders configured to adjust a transverse position of the roller stand platform.

17. The system of claim 16, further comprising a control unit configured to receive instructions from the computing device and to communicate the instructions to each of the first plurality of hydraulic cylinders, the second plurality of hydraulic cylinders, and the third plurality of hydraulic cylinders, the control unit being in communication with and responsive to position signals from the laser beam sensing screens.

18. A method of aligning the heights of opposing roller stands, the method comprising:
positioning a laser transmission unit on a first roller stand and a target unit on a second roller stand, wherein the laser transmission unit comprises a first front plate defining a first laser transmission hole therethrough, a first back plate axially spaced from the first front plate, a first arcuate panel extending axially between the first front plate and the first back plate and being configured to contact a first pair of roller wheels of the first roller stand, and a laser centrally mounted through the first back plate and extending to the first front plate, such that a laser beam produced by the laser is transmitted through the first laser transmission hole of the first front plate; and wherein the target unit comprises a second front plate defining a second laser transmission hole therethrough, a second back plate axially spaced from the second front plate and being provided with an image of a target, the target having a center aligned with the second laser transmission hole, and a second arcuate panel extending axially between the second front plate and the second back plate and being configured to contact a second pair of roller wheels of the second roller stand;
directing a laser beam from the laser transmission unit to the target unit;
determining a location at which the laser beam contacts the second back plate of the target unit; and
adjusting a position of the first roller stand until the laser beam contacts the center of the target.

19. The method of claim 18, wherein the determining a location at which the laser beam contacts the target unit comprises receiving, in a computing device, a signal from a laser beam sensing screen disposed over a front surface of the second back plate of the target unit and quantifying the location at which the laser beam contacts the target unit, using the computing device.

20. The method of claim 18, wherein the adjusting a position of the first roller stand comprises communicating instructions from the computing device to a control unit in electronic communication with a roller stand platform disposed beneath the first roller stand; wherein the roller stand platform comprises a first plurality of hydraulic cylinders configured to adjust a vertical height of the roller stand platform, a second plurality of hydraulic cylinders configured to adjust an axial position of the roller stand platform, and a third plurality of hydraulic cylinders configured to adjust a transverse position of the roller stand platform; and wherein the control unit communications the instructions to each of the first plurality of hydraulic cylinders, the second plurality of hydraulic cylinders, and the third plurality of hydraulic cylinders.

* * * * *